United States Patent
Harris et al.

(10) Patent No.: US 9,791,564 B1
(45) Date of Patent: Oct. 17, 2017

(54) ADAPTIVE FILTERING FOR FMCW INTERFERENCE MITIGATION IN PMCW RADAR SYSTEMS

(71) Applicant: UHNDER, INC., Austin, TX (US)

(72) Inventors: Fred Harris, Lemon Grove, CA (US); David Trager, Buda, TX (US); Curtis Davis, St. Louis, MO (US); Raghunath K. Rao, Austin, TX (US)

(73) Assignee: UHNDER, INC., Austin, TX (US)

( * ) Notice: Subject to any disclaimer, the term of this patent is extended or adjusted under 35 U.S.C. 154(b) by 0 days.

(21) Appl. No.: 15/492,160

(22) Filed: Apr. 20, 2017

Related U.S. Application Data

(60) Provisional application No. 62/450,184, filed on Jan. 25, 2017, provisional application No. 62/327,005, filed on Apr. 25, 2016.

(51) Int. Cl.
  *G01S 13/93* (2006.01)
  *G01S 13/34* (2006.01)
  *G01S 13/00* (2006.01)

(52) U.S. Cl.
  CPC ........... *G01S 13/931* (2013.01); *G01S 13/34* (2013.01); *G01S 13/93* (2013.01)

(58) Field of Classification Search
  CPC ... G01S 7/02; G01S 7/36; G01S 13/02; G01S 13/06; G01S 13/08; G01S 13/32;
  (Continued)

(56) References Cited

U.S. PATENT DOCUMENTS

| | | | |
|---|---|---|---|
| 1,882,128 | A | 10/1932 | Fearing |
| 3,374,478 | A | 3/1968 | Blau |

(Continued)

FOREIGN PATENT DOCUMENTS

| | | |
|---|---|---|
| EP | 0725480 | 11/2011 |
| EP | 2821808 | 7/2015 |

(Continued)

OTHER PUBLICATIONS

Chambers et al., An article entitled "Real-Time Vehicle Mounted Multistatic Ground Penetrating Radar Imaging System for Buried Object Detection," Lawrence Livermore National Laboratory Reports (LLNL-TR-615452), Feb. 4, 2013; Retrieved from the Internet from https://e-reports-ext.llnl.gov/pdf/711892.pdf.

(Continued)

*Primary Examiner* — Bernarr E Gregory
(74) *Attorney, Agent, or Firm* — Uhnder, Inc.

(57) ABSTRACT

A radar sensing system for a vehicle includes a transmitter configured for installation and use on a vehicle and able to transmit radio signals. The radar sensing system also includes a receiver and a processor. The receiver is configured for installation and use on the vehicle and able to receive radio signals. The received radio signals include transmitted radio signals that are reflected from objects in the environment. The received radio signals further include radio signals transmitted by at least one other radar system. The processor samples the received radio signals to produce a sampled stream. The processor is configured to control an adaptive filter. Responsive to the processor, the adaptive filter is configured to filter the sampled stream, such that the radio signals transmitted by the at least one other radar system are removed from the received radio signals.

21 Claims, 14 Drawing Sheets

(58) Field of Classification Search
CPC .......... G01S 13/34; G01S 13/88; G01S 13/93;
G01S 13/931; H03H 21/0012; H03H
21/0025; H03H 21/0027; H03H 21/0043;
H03H 2021/0049; H03H 2021/0056;
H04B 3/02; H04B 3/20; H04B 3/23
See application file for complete search history.

(56) References Cited

U.S. PATENT DOCUMENTS

| | | | |
|---|---|---|---|
| 3,735,395 A | 5/1973 | Ross | |
| 3,750,169 A | 7/1973 | Strenglein | |
| 3,896,434 A | 7/1975 | Sirven | |
| 4,176,351 A | 11/1979 | De Vita et al. | |
| 4,939,685 A * | 7/1990 | Feintuch | H03H 21/0027 |
| | | | 708/321 |
| 5,034,906 A | 7/1991 | Chang | |
| 5,087,918 A | 2/1992 | May et al. | |
| 5,151,702 A | 9/1992 | Urkowitz | |
| 5,175,710 A | 12/1992 | Hutson | |
| 5,218,619 A | 6/1993 | Dent | |
| 5,280,288 A | 1/1994 | Sherry et al. | |
| 5,341,141 A | 8/1994 | Frazier et al. | |
| 5,345,470 A | 9/1994 | Alexander | |
| 5,657,023 A | 8/1997 | Lewis et al. | |
| 5,724,041 A | 3/1998 | Inoue et al. | |
| 5,892,477 A | 4/1999 | Wehling | |
| 5,917,430 A | 6/1999 | Greneker, III et al. | |
| 5,920,285 A | 7/1999 | Benjamin | |
| 5,931,893 A | 8/1999 | Dent et al. | |
| 5,959,571 A | 9/1999 | Aoyagi et al. | |
| 6,067,314 A | 5/2000 | Azuma | |
| 6,069,581 A | 5/2000 | Bell et al. | |
| 6,121,872 A | 9/2000 | Weishaupt | |
| 6,121,918 A * | 9/2000 | Tullsson | G01S 7/36 |
| | | | 342/128 |
| 6,191,726 B1 * | 2/2001 | Tullsson | G01S 7/36 |
| | | | 342/128 |
| 6,184,829 B1 | 9/2001 | Stilp | |
| 6,288,672 B1 | 9/2001 | Asano et al. | |
| 6,347,264 B2 | 2/2002 | Nicosia et al. | |
| 6,400,308 B1 | 6/2002 | Bell et al. | |
| 6,411,250 B1 | 6/2002 | Oswald et al. | |
| 6,417,796 B1 | 7/2002 | Bowlds | |
| 6,583,753 B1 | 6/2003 | Reed | |
| 6,614,387 B1 | 9/2003 | Deadman | |
| 6,624,784 B1 | 9/2003 | Yamaguchi | |
| 6,674,908 B1 | 1/2004 | Aronov | |
| 6,714,956 B1 * | 3/2004 | Liu | H03H 21/0043 |
| | | | 708/322 |
| 6,747,595 B2 | 6/2004 | Hirabe | |
| 6,768,391 B1 | 7/2004 | Dent et al. | |
| 7,119,739 B1 | 10/2006 | Struckman | |
| 7,289,058 B2 | 10/2007 | Shima | |
| 7,299,251 B2 * | 11/2007 | Skidmore | H03H 21/0043 |
| | | | 708/322 |
| 7,338,450 B2 | 3/2008 | Kristofferson et al. | |
| 7,460,055 B2 | 12/2008 | Nishijima et al. | |
| 7,545,310 B2 | 6/2009 | Matsuoka | |
| 7,545,321 B2 | 6/2009 | Kawasaki | |
| 7,564,400 B2 | 7/2009 | Fukuda | |
| 7,609,198 B2 | 10/2009 | Chang | |
| 7,642,952 B2 | 1/2010 | Fukuda | |
| 7,663,533 B2 | 2/2010 | Toennesen et al. | |
| 7,728,762 B2 | 6/2010 | Sakamoto | |
| 7,791,528 B2 | 9/2010 | Klotzbuecher et al. | |
| 7,847,731 B2 | 12/2010 | Wiesbeck | |
| 7,855,677 B2 | 12/2010 | Negoro et al. | |
| 7,859,450 B2 | 12/2010 | Shirakawa et al. | |
| 8,019,352 B2 | 9/2011 | Rappaport et al. | |
| 8,049,663 B2 | 11/2011 | Frank et al. | |
| 8,102,306 B2 | 1/2012 | Smith, Jr. et al. | |
| 8,154,436 B2 | 4/2012 | Szajnowski | |
| 8,330,650 B2 | 12/2012 | Goldman | |
| 8,390,507 B2 | 3/2013 | Wintermantel | |
| 8,532,159 B2 | 9/2013 | Kagawa et al. | |
| 8,547,988 B2 | 10/2013 | Hadani et al. | |
| 8,686,894 B2 | 4/2014 | Fukuda et al. | |
| 8,694,306 B1 | 4/2014 | Short et al. | |
| 9,121,943 B2 | 9/2015 | Stirling-Gallacher et al. | |
| 9,239,378 B2 | 1/2016 | Kishigami et al. | |
| 9,239,379 B2 | 1/2016 | Burgio et al. | |
| 9,282,945 B2 | 3/2016 | Smith et al. | |
| 9,335,402 B2 | 5/2016 | Maeno et al. | |
| 9,541,639 B2 | 1/2017 | Searcy et al. | |
| 9,568,600 B2 | 2/2017 | Alland | |
| 9,575,160 B1 | 2/2017 | Davis et al. | |
| 9,599,702 B1 | 3/2017 | Bordes et al. | |
| 2002/0004692 A1 | 1/2002 | Nicosia et al. | |
| 2002/0075178 A1 | 6/2002 | Woodington et al. | |
| 2002/0155811 A1 | 10/2002 | Prismantas | |
| 2003/0058166 A1 | 3/2003 | Hirabe | |
| 2003/0235244 A1 | 12/2003 | Pessoa et al. | |
| 2004/0012516 A1 | 1/2004 | Schiffmann et al. | |
| 2004/0015529 A1 * | 1/2004 | Tanrikulu | H04B 3/23 |
| | | | 708/322 |
| 2004/0066323 A1 | 4/2004 | Richter | |
| 2004/0138802 A1 | 7/2004 | Kuragaki et al. | |
| 2005/0069162 A1 | 3/2005 | Haykin | |
| 2005/0201457 A1 | 9/2005 | Allred et al. | |
| 2005/0225476 A1 | 10/2005 | Hoetzel et al. | |
| 2006/0012511 A1 | 1/2006 | Dooi et al. | |
| 2006/0036353 A1 | 2/2006 | Wintermantel | |
| 2006/0109170 A1 | 5/2006 | Voigtlaender et al. | |
| 2006/0109931 A1 | 5/2006 | Asai | |
| 2006/0114324 A1 | 6/2006 | Farmer et al. | |
| 2006/0181448 A1 | 8/2006 | Natsume et al. | |
| 2006/0262007 A1 | 11/2006 | Bonthron et al. | |
| 2007/0018884 A1 | 1/2007 | Adams | |
| 2007/0018886 A1 | 1/2007 | Watanabe et al. | |
| 2007/0109175 A1 | 5/2007 | Fukuda | |
| 2007/0120731 A1 | 5/2007 | Kelly, Jr. et al. | |
| 2007/0132633 A1 | 6/2007 | Uchino | |
| 2007/0152870 A1 | 7/2007 | Woodington et al. | |
| 2007/0152871 A1 | 7/2007 | Puglia | |
| 2007/0152872 A1 | 7/2007 | Woodington | |
| 2007/0164896 A1 | 7/2007 | Suzuki et al. | |
| 2007/0182623 A1 | 8/2007 | Zeng et al. | |
| 2007/0188373 A1 | 8/2007 | Shirakawa et al. | |
| 2007/0200747 A1 | 8/2007 | Okai et al. | |
| 2008/0208472 A1 | 8/2008 | Morcom | |
| 2009/0015459 A1 | 1/2009 | Mahler et al. | |
| 2009/0015464 A1 | 1/2009 | Fukuda | |
| 2009/0073025 A1 | 3/2009 | Inoue et al. | |
| 2009/0079617 A1 | 3/2009 | Shirakawa et al. | |
| 2009/0121918 A1 | 5/2009 | Shirai et al. | |
| 2009/0212998 A1 | 8/2009 | Szajnowski | |
| 2009/0237293 A1 | 9/2009 | Sakuma | |
| 2009/0295623 A1 | 12/2009 | Falk | |
| 2010/0116365 A1 | 5/2010 | McCarty | |
| 2010/0156690 A1 | 6/2010 | Kim et al. | |
| 2010/0198513 A1 | 8/2010 | Zeng et al. | |
| 2010/0277359 A1 | 11/2010 | Ando | |
| 2011/0006944 A1 | 1/2011 | Goldman | |
| 2011/0187600 A1 | 8/2011 | Landt | |
| 2011/0196568 A1 | 8/2011 | Nickolaou et al. | |
| 2011/0279303 A1 | 11/2011 | Smith, Jr. et al. | |
| 2011/0279307 A1 | 11/2011 | Song | |
| 2011/0285576 A1 | 11/2011 | Lynam | |
| 2011/0291874 A1 | 12/2011 | De Mersseman | |
| 2011/0292971 A1 | 12/2011 | Hadani et al. | |
| 2012/0001791 A1 | 1/2012 | Wintermantel | |
| 2012/0050093 A1 | 3/2012 | Heilmann et al. | |
| 2012/0112957 A1 | 5/2012 | Nguyen et al. | |
| 2012/0173246 A1 | 7/2012 | Choi et al. | |
| 2012/0257643 A1 | 10/2012 | Wu et al. | |
| 2013/0016761 A1 | 1/2013 | Nentwig | |
| 2013/0027240 A1 | 1/2013 | Chowdhury | |
| 2013/0069818 A1 | 3/2013 | Shirakawa et al. | |
| 2013/0102254 A1 | 4/2013 | Cyzs | |
| 2013/0113653 A1 | 5/2013 | Kishigami et al. | |
| 2013/0135140 A1 | 5/2013 | Kishigami | |
| 2013/0169485 A1 | 7/2013 | Lynch | |
| 2013/0176154 A1 | 7/2013 | Bonaccio et al. | |

(56) References Cited

U.S. PATENT DOCUMENTS

| | | |
|---|---|---|
| 2013/0229301 A1 | 9/2013 | Kanamoto |
| 2013/0244710 A1 | 9/2013 | Nguyen et al. |
| 2013/0314271 A1 | 11/2013 | Braswell et al. |
| 2014/0028491 A1 | 1/2014 | Ferguson |
| 2014/0035774 A1 | 2/2014 | Khlifi |
| 2014/0085128 A1 | 3/2014 | Kishigami et al. |
| 2014/0111372 A1 | 4/2014 | Wu |
| 2014/0159948 A1 | 6/2014 | Ishimori et al. |
| 2014/0220903 A1 | 8/2014 | Schulz et al. |
| 2014/0253345 A1 | 9/2014 | Breed |
| 2014/0348253 A1 | 11/2014 | Mobasher et al. |
| 2015/0035662 A1 | 2/2015 | Bowers et al. |
| 2015/0061922 A1 | 3/2015 | Kishigami |
| 2015/0198709 A1 | 7/2015 | Inoue |
| 2015/0204966 A1 | 7/2015 | Kishigami |
| 2015/0226848 A1 | 8/2015 | Park |
| 2015/0234045 A1 | 8/2015 | Rosenblum et al. |
| 2015/0247924 A1 | 9/2015 | Kishigami |
| 2015/0301172 A1 | 10/2015 | Ossowska et al. |
| 2015/0323660 A1 | 11/2015 | Hampikian |
| 2016/0003939 A1 | 1/2016 | Stainvas et al. |
| 2016/0018511 A1 | 1/2016 | Nayyar et al. |
| 2016/0033631 A1 | 2/2016 | Searcy et al. |
| 2016/0041260 A1 | 2/2016 | Cao et al. |
| 2016/0061935 A1 | 3/2016 | McCloskey et al. |
| 2016/0084941 A1 | 3/2016 | Hassan |
| 2016/0084943 A1 | 3/2016 | Arage |
| 2016/0139254 A1 | 5/2016 | Wittenberg |
| 2016/0238694 A1 | 8/2016 | Kishigami |
| 2017/0023661 A1 | 1/2017 | Richert |

FOREIGN PATENT DOCUMENTS

| | | | |
|---|---|---|---|
| FR | 2751086 | 1/1998 | |
| FR | 2751086 A1 * | 1/1998 | ............... G01S 7/36 |
| WO | WO2015175078 | 11/2015 | |
| WO | WO2015185058 | 12/2015 | |
| WO | WO2016/011407 | 1/2016 | |
| WO | WO2016030656 | 3/2016 | |

OTHER PUBLICATIONS

Fraser, "Design and simulation of a coded sequence ground penetrating radar," In: Diss. University of British Columbia, Dec. 3, 2015.

Zhou et al., "Linear extractors for extracting randomness from noisy sources," In: Information Theory Proceedings (ISIT), 2011 IEEE International Symposium on Oct. 3, 2011.

International Search Report and Written Opinion dated Aug. 7, 2017 from corresponding PCT Application No. PCT/IB2017/052281.

* cited by examiner

ADAPTIVE FILTERING FOR FMCW INTERFERENCE MITIGATION IN PMCW RADAR SYSTEMS

CROSS REFERENCE TO RELATED APPLICATIONS

The present application claims the filing benefits of U.S. provisional applications, Ser. No. 62/450,184, filed Jan. 25, 2017, and Ser. No. 62/327,005, filed Apr. 25, 2016, which are both hereby incorporated by reference herein in their entireties.

FIELD OF THE INVENTION

The present invention is directed to radar systems, and more particularly to radar systems for vehicles.

BACKGROUND OF THE INVENTION

The use of radar to determine range and velocity of objects in an environment is important in a number of applications including automotive radar and gesture detection. A radar system typically transmits radio signals and listens for the reflection of the radio signals from objects in the environment. By comparing the transmitted radio signals with the received radio signals, a radar system can determine the distance to an object. Using multiple transmissions, the velocity of an object can be determined. Using multiple transmitters and receivers, the location (angle) of an object can also be determined.

There are several types of signals used in different types of radar systems. One type of radar signal is known as a frequency-modulated continuous waveform (FMCW). In an FMCW radar system, the transmitter of the radar system sends a continuous signal in which the frequency of the signal varies. This is sometimes called a chirp radar system. Mixing (multiplying) the reflected wave from an object with a replica of the transmitted signal results in a CW signal with a frequency that represents the distance between the radar transmitter/receiver and the object. By sweeping up in frequency and then down in frequency, the Doppler frequency can also be determined.

Another type of radar signal is known as a phase-modulated continuous waveform (PMCW). For this type of radio signal, the phase of the transmitted signal is modulated according to a certain pattern or code, sometimes called the spreading code, known at the PMCW radar receiver. The transmitted signal is phase modulated by mixing a baseband signal (e.g., with two values +1 and −1) with a local oscillator to generate a transmitted signal with a phase that is changing corresponding to the baseband signal (e.g., +1 corresponding to a phase of 0 radians and −1 corresponding to a phase of $\pi$ radians). For a single transmitter, a sequence of phase values that form the code or spreading code that has good autocorrelation properties is required so that ghost objects are minimized. The rate at which the phase is modulated determines the bandwidth of the transmitted signal and is called the chip rate.

In a PMCW radar system, the receiver performs correlations of the received signal with time-delayed versions of the transmitted signal and looks for peaks in the correlation. The time-delay of the transmitted signal that yields peaks in the correlation corresponds to the delay of the transmitted signal when reflected off an object. The distance to the object is found from that delay and the speed of light.

A PMCW radar will receive not only the reflected signals from the transmitter of the PMCW radar. A PMCW radar operating in the presence of an FMCW radar will also receive the signals from the FMCW radar. The signal from the FMCW radar can significantly affect the performance of a conventional PMCW radar system. Potentially, these FMCW signals can be much stronger than the reflected signals from the PMCW radar. This may cause the radar system's estimated range, velocity and direction to be significantly in error.

SUMMARY OF THE INVENTION

The present invention provides methods and a system for achieving better performance in a radar system using phase-modulated continuous wave (PMCW) radar when there are one or more other radar systems using a frequency-modulated continuous wave (FMCW) type of radar transmission and operating simultaneously. The invention accomplishes better detectability of a PMCW radar object by applying a filtering technique to the received radio signal that mitigates the effect of an interfering FMCW radar on the PMCW radar. Another source of potential interference is clock harmonics. The same techniques that are described below for FMCW interference mitigation will also work on clock harmonics.

A radar sensing system for a vehicle in accordance with an embodiment of the present invention includes at least one transmitter, at least one receiver, a memory, and a processor. The at least one transmitter is configured for installation and use on a vehicle and further operable or configured to transmit a radio frequency (RF) signal. The at least one transmitter is further operable or configured to transmit an RF signal using a phase modulated signal. The transmitted RF signal is generated by up-converting a baseband signal. The at least one receiver is configured for installation and use on the vehicle and further operable or configured to receive an RF signal. The received RF signal includes the transmitted RF signal reflected from multiple objects in the environment and potentially radio signals from other radars such as a frequency modulated continuous wave (FMCW) radar transmitter. The received RF signal is down-converted and sampled. The sampled result is provided to a processor. The processor selectively applies an adaptive filter to the received RF signal to mitigate the effect of an interfering waveform from a radar transmitting an FMCW radio signal. After adaptively filtering the received RF signal, the radar performs correlations with various delayed versions of the baseband transmitted signal. The correlations are used to determine an improved range, velocity and angle of objects in the environment.

A radar sensing system for a vehicle in accordance with an embodiment of the present invention includes at least one transmitter, at least one receiver, a memory, and a processor. The at least one transmitter is configured for installation and use on a vehicle and transmits a radio frequency (RF) signal. The at least one transmitter phase modulates the transmitted RF signal using codes generated by at least one of a pseudo-random sequence generator and a truly random number generator. The at least one receiver is configured for installation and use on the vehicle and further operable or configured to receive an RF signal. The received RF signal includes the transmitted RF signal reflected from an object. In addition, the received RF signal may also include radio signals transmitted from one or more other radar systems, for example an FMCW radar. A down-converted received RF signal is sampled and provided to a processor. The processor selectively and adaptively filters the sampled signal to mitigate the effect of the FMCW radar on the PMCW radar system and then estimates the range, velocity and angle of objects in the environment.

A radar sensing system for a vehicle in accordance with an embodiment of the present invention includes at least one transmitter, at least one receiver, a memory, and a processor. The at least one transmitter is configured for installation and use on a vehicle and transmits a radio frequency (RF) signal. The at least one receiver is configured for installation and use on the vehicle and further operable or configured to receive an RF signal containing signals reflected from the transmitted signal as well as signals from one or more other radar systems. The reflected RF signal is the transmitted RF signal reflected from objects in the environment of the radar system. The radio signals from one or more other radar systems may be from an FMCW type of radar. A down-converted received RF signal is sampled and provided to a processor. The processor selectively filters out the interference from the FMCW radar system in an adaptive manner.

The radar system may include in the receiver a mechanism for deciding when to employ the cancellation (filtering) processing. The decision could be based on measuring the root mean square value (i.e., magnitude) of both the input and the output of the adaptive filter. The decision to filter could also be based on additional information such as obtained from other receivers in the radar system.

These and other objects, advantages, purposes and features of the present invention will become apparent upon review of the following specification in conjunction with the drawings.

DESCRIPTION OF THE PREFERRED EMBODIMENTS

Figure 1:
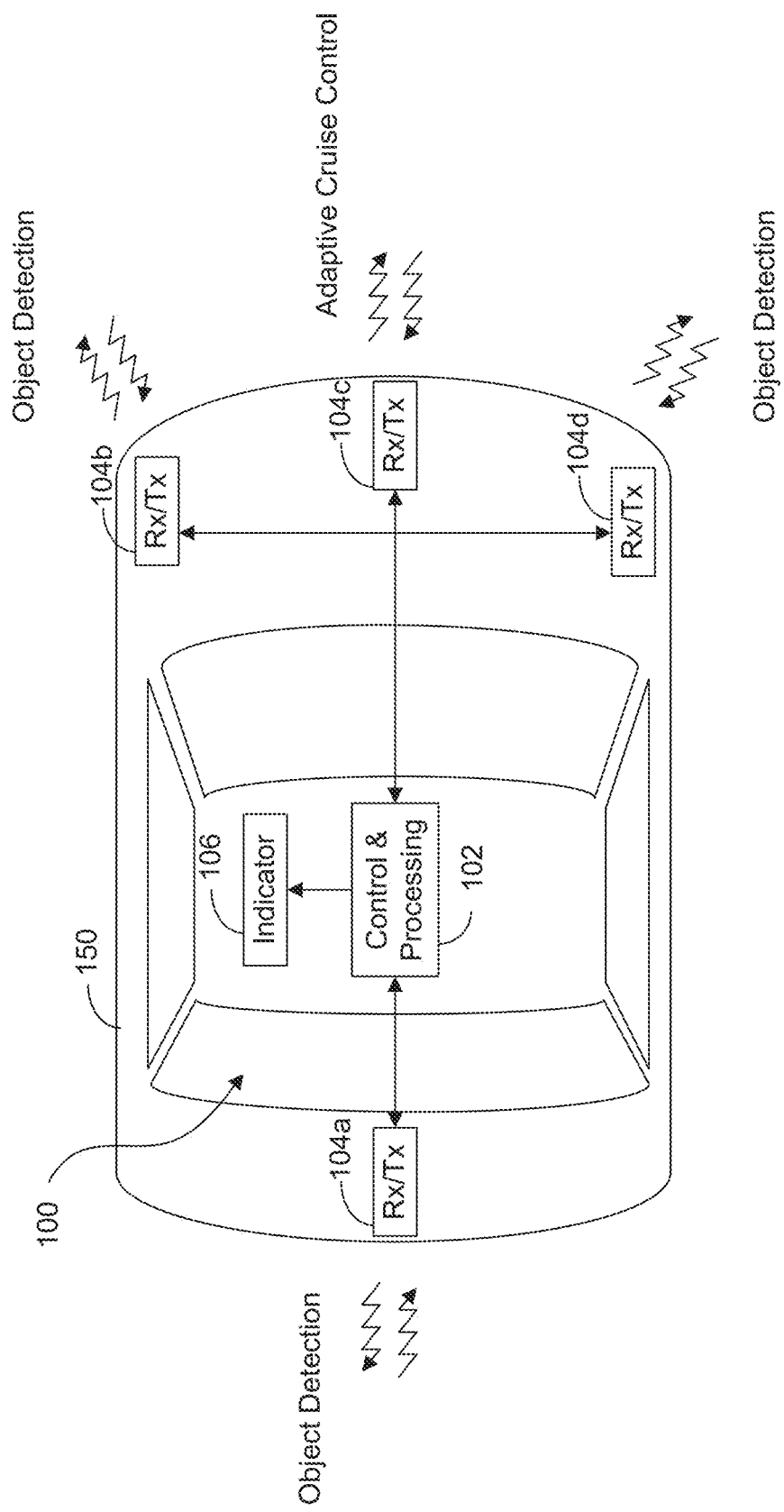
FIG. 1 is a plan view of an automobile equipped with one or more radar systems in accordance with the present invention.

The present invention will now be described with reference to the accompanying figures, wherein numbered elements in the following written description correspond to like-numbered elements in the figures. Methods and systems of the present invention may achieve better performance from a radar system in the presence of a simultaneously operating FMCW radar by applying an adaptive filter to the down-converted and sampled received RF signal at one or more of the receivers in a radar system. The adaptive filtering may be selectively applied based on a measurement of the interference as well by considering other factors or conditions.

A radar system utilizes one or more transmitters to transmit signals. These signals are reflected from objects (also known as targets) in the environment and received by one or more receivers of the radar system. A transmitter-receiver pair is called a virtual radar (or sometimes a virtual receiver).

The transmitted radio signal from each radar transmitter consists of a baseband transmitted signal, which is up-converted to an RF signal by an RF upconverter. The up-converted RF signal may be obtained by mixing the baseband transmitted signal with a local oscillator signal at a carrier frequency. The baseband transmitted signal used for transmission by one transmitter of the radar system might be phase modulated using a series of codes. These codes, for example, consist of repeated sequences of random or pseudo-random binary values for one transmitter, e.g., (−1, −1, −1, −1, 1, 1, 1, −1, 1, 1, −1, −1, 1, −1, 1), although any sequence, including non-binary sequences and non-periodic sequences could be used and different sequences could be used for phase modulating the outputs of different transmitters. Each value of the phase modulation code sequence is often called a chip. A chip would last a certain duration called the chip time. The inverse of the chip time is the chip rate. That is, the chip rate is the number of chips per second. In an exemplary aspect of the present invention, the sequences of random binary values may be provided by a truly random number generator. A truly random number generator is explained in more detail in U.S. Pat. No. 9,575,160, which is hereby incorporated by reference herein in its entirety. The random bit stream (with values +1 or −1) from the truly random number generator may be multiplied with an output of pseudorandom binary values from a pseudorandom number generator (PRNG).

The transmitted radio signals are reflected from objects in the environment and are received back at the radar receivers (or virtual receivers). Each object in the environment may reflect the transmitted radio signal. The received radio signal at the radar system would consist of the sum of the radio signals reflected from various objects (targets) in the environment. In addition, a second radar system operating in the vicinity of the first radar system will generate a transmitted radio signal that may be received by the first radar system and interfere with the reflected radio signals from the first radar system. In other words, the first radar system would receive radio signals that include radio signals from transmitters of the first radar system that are reflected from objects in the environment, as well as radio signals transmitted by one or more other radar systems.

At the receiver (receive pipeline) of the radar system, the received radio signal is down-converted by typical amplification, filtering, and mixing with in-phase and quadrature-phase components of an oscillator. The output after down-conversion and sampling is a sequence of complex value digitized samples comprising a mathematical real component and a mathematical imaginary component that are provided to a processor. The baseband signals used at the transmitter and the reflected radio signals after down-conversion in the receiver are provided to correlators. The complex valued digitized samples at the output of the down-converter are correlated with various time-delayed replicas of the baseband transmitted signals for different receivers to produce complex correlation values over a certain duration. That is, a sequence of digitized samples that correspond to a certain time duration of the received signal are correlated with a time-delayed replica of the baseband transmitted signal. The process is repeated for subsequent samples, thus producing a sequence of complex correlation values for a given time-delay. This process is also performed for different transmitter/receiver pairs (virtual receivers).

A selected correlator that has a replica that is matched in delay to the time delay of the reflected radio signal from an object will produce a large magnitude complex correlator output. A single correlator will produce a sequence of correlator outputs that are large if the reflected signal has a delay that matches the delay of the replica of the baseband transmitted signal. If the velocity of the radar system is different from the velocity of the object causing the reflection, there will be a Doppler shift in the frequency of the reflected signal relative to the transmitted signal. A sequence of correlator outputs for one particular delay corresponding to an object moving in the environment will have complex values that rotate at a rate related to the Doppler shift. Using a sequence of correlator outputs (also referred to as a scan), the Doppler shift may be estimated, and thus the velocity of the object in the environment determined. The longer the sequence of correlator outputs used to estimate the Doppler frequency, the greater the accuracy and resolution of the estimation of the Doppler frequency, and thus the greater the accuracy in estimating the velocity of the object.

The correlation values for various time delays and various virtual radars are arranged in two-dimensional arrays known as time slices. A time slice is a two-dimensional array with one dimension corresponding to delay or range bin and the other dimension corresponding to the virtual radar (transmitter-receiver pair). The samples are placed into respective range bins of the two-dimensional array (as used herein, a range bin refers to a distance range corresponding to a particular time delay corresponding to the round-trip time of the radar signal from a transmitter, to the target/object, and back to the receiver). The virtual receivers of the radar system define one axis of the two-dimensional time slice and the range bins define the second axis of the two-dimensional time slice. Another new time slice comprising complex correlation values is generated every 2-30 microseconds. Over a longer time interval, herein referred to as a "scan" (typically, in a duration of 1-60 milliseconds or longer), multiple time slices are accumulated to form a three-dimensional radar data cube. One axis or dimension of the three-dimensional radar data cube is defined by time (of each respective time slice requiring 2-30 microseconds), while the receivers (or virtual radar) define a second axis of the three-dimensional radar data cube, and the range bins and their corresponding time delays define a third axis of the three-dimensional radar data cube. A radar data cube may have a preselected or dynamically defined quantity of time slices. For example, a radar data cube may include 100 time slices or 1000 time slices of data. Similarly, a radar data cube may include different numbers of range bins. The optimized use of radar data cubes is described in detail in U.S. Pat. No. 9,599,702, which is hereby incorporated by reference herein in its entirety.

A single correlator output corresponding to a particular range bin (or delay) is a complex value that corresponds to the sum of products between a time-delayed replica of the baseband transmitted signal—with a time-delayed replica corresponding to each range bin—and the received down-converted complex samples. When a particular time-delayed replica in a particular range bin correlates highly with the received signal, it is an indication of the time delay (i.e., range of the object) for the transmitted radio signal that is received after the transmitted radio signal reflects from an object. Multiple correlators produce multiple complex correlation values corresponding to different range bins or delays. As discussed herein, each time slice contains one correlation value in a time series of correlation values upon which Doppler processing is performed (e.g., Fast Fourier Transform). In other words, a time series of complex correlation values for a given range bin is used to determine the Doppler frequency and thus the velocity of an object in the range bin. The larger the number of correlation values in the time series, the higher the Doppler resolution. A matched filter may also be used to produce a set of outputs that correspond to the correlator outputs for different delays.

There may be scans for different correlators that use replicas of the transmitted signal with different delays. Because there are multiple transmitters and multiple receivers, there may be correlators that process a received radio signal at each receiver that are matched to a particular transmitted radio signal by a particular transmitter. Each transmitter-receiver pair is called a "virtual radar" (a radar system preferably has 4 virtual radars, or more preferably 32 virtual radars, and most preferably 256 or more virtual radars). The receive pipeline of the radar system will thus generate a sequence of correlator outputs (time slices) for each possible delay and for each transmitter-receiver pair. This set of data is called a radar data cube (RDC). The delays are also called range bins. The part of the radar data cube for one point in the sequence of correlator outputs is called a time slice, and it contains one correlator output for each range bin and transmitter-receiver pair combination.

The complex-valued correlation values contained in a three-dimensional radar data cube may be processed, preferably by a processor established as a CMOS processor and coprocessor on a semiconductor substrate, which is typically a silicon substrate. In one embodiment, the processor comprises fixed function and programmable CPUs and/or programmable logic controls (PLCs). Preferably, the system will be established with a radar system architecture (including, for example, analog RF circuitry for the radar, processor(s) for radar processing, memory module(s), and other associated components of the radar system) all on a common semiconductor substrate. The system may preferably incorporate additional processing capabilities (such as, for example, image processing of image data captured by one or more vehicle cameras such as by utilizing aspects of the systems described in U.S. Pat. Nos. 5,877,897; 5,796, 094; 6,396,397; 6,690,268 and 5,550,677, which are hereby incorporated herein by reference in their entireties) within the same semiconductor substrate as well.

The ability of a continuous wave radar system to distinguish multiple targets is dependent upon the radar system's range, angle, and Doppler resolutions. Range resolution is limited by a radar's bandwidth (i.e., the chip rate in a phase modulated continuous wave radar), while angle resolution is limited by the size of the antenna array aperture. Meanwhile, increasing Doppler resolution only requires a longer scan. A high Doppler resolution is very valuable because no matter how close two objects or targets are to each other, as long as they have slightly differing radial velocity (their velocity towards or away from the radar system), they can be distinguished by a radar system with a sufficiently high enough Doppler resolution. As discussed herein, the detection of objects with a PMCW radar system may be adversely effected by the nearby operation of one or more frequency modulated continuous wave (FMCW) radar systems.

FIG. 1 illustrates an exemplary radar system 100 configured for use in a vehicle 150. In an aspect of the present invention, a vehicle 150 may be an automobile, truck, or bus, etc. As illustrated in FIG. 1, the radar system 100 may comprise one or more transmitters and one or more receivers 104a-104d for a plurality of virtual radars. Other configurations are also possible. As illustrated in FIG. 1, the radar system 100 may comprise one or more receivers/transmitters 104a-104d, control and processing module 102 and indicator 106. Other configurations are also possible. FIG. 1 illustrates the receivers/transmitters 104a-104d placed to acquire and provide data for object detection and adaptive cruise control. The radar system 100 (providing such object detection and adaptive cruise control or the like) may be part of an Advanced Driver Assistance System (ADAS) for the automobile 150.

Figure 2:
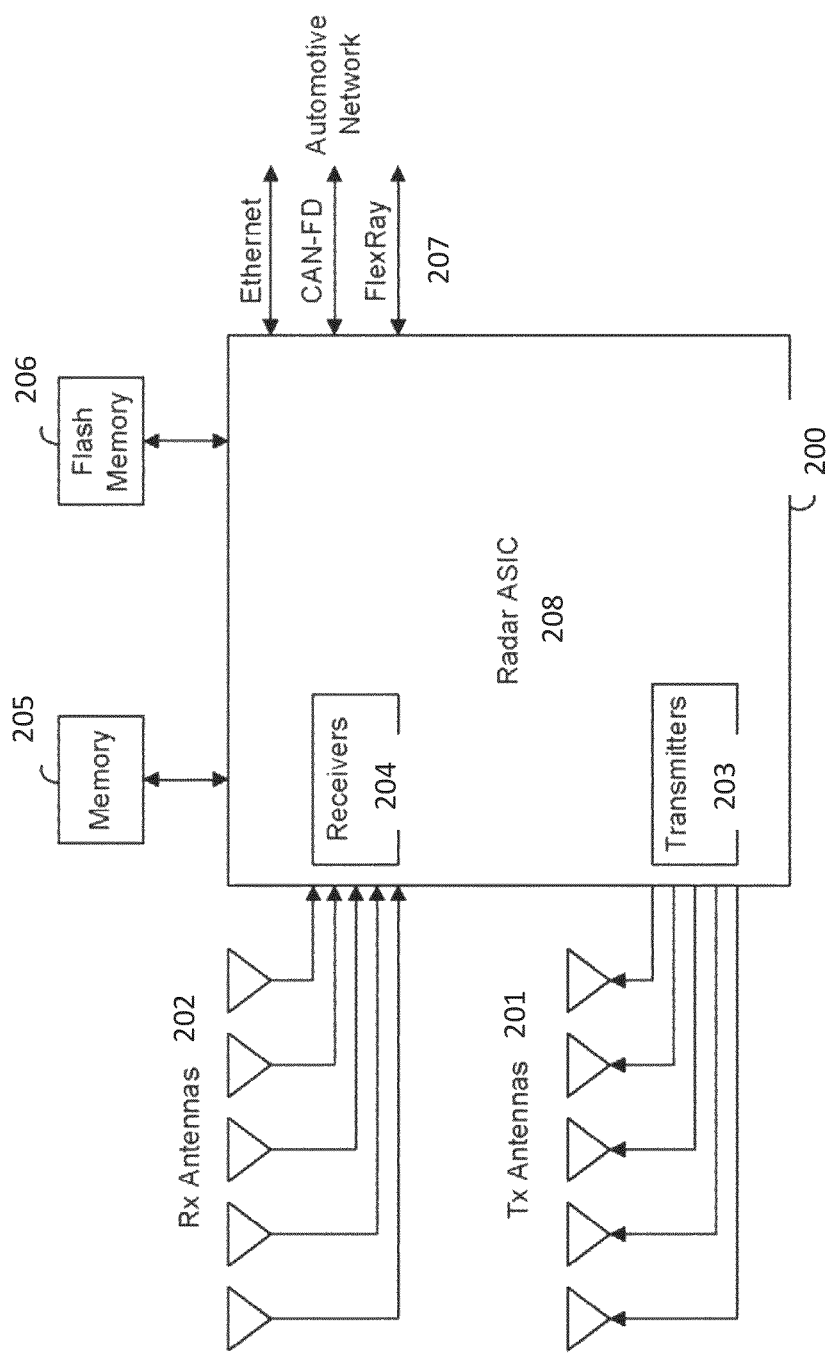
FIG. 2 is a block diagram illustrating a radar system with a plurality of receivers and a plurality of transmitters in accordance with the present invention.

FIG. 2 illustrates the structure of an exemplary radar system 200 containing one or more transmitting antennas 201, one or more receiving antennas 202, one or more transmitters 203, one or more receivers 204, memory modules 205, 206, as well as interfaces to other parts of a vehicle system via various types of networks 207, such as Ethernet, CAN-FD, or FlexRay. There may also be processing capability contained in the ASIC 208 apart from the transmitters 203 and receivers 204.

The radar sensing system of the present invention may utilize aspects of the radar systems described in U.S. Pat. Nos. 9,575,160 and/or 9,599,702, and/or U.S. patent application Ser. No. 15/416,219, filed Jan. 26, 2017, and/or Ser. No. 15/292,755, filed Oct. 13, 2016, and/or U.S. provisional applications, Ser. No. 62/382,857, filed Sep. 2, 2016, Ser. No. 62/381,808, filed Aug. 31, 2016, Ser. No. 62/327,003, filed Apr. 25, 2016, Ser. No. 62/327,004, filed Apr. 25, 2016, Ser. No. 62/327,006, filed Apr. 25, 2016, Ser. No. 62/327,015, filed Apr. 25, 2016, Ser. No. 62/327,016, filed Apr. 25, 2016, Ser. No. 62/327,017, filed Apr. 25, 2016, Ser. No. 62/327,018, filed Apr. 25, 2016, and/or Ser. No. 62/319,613, filed Apr. 7, 2016, which are all hereby incorporated by reference herein in their entireties.

Figure 3:
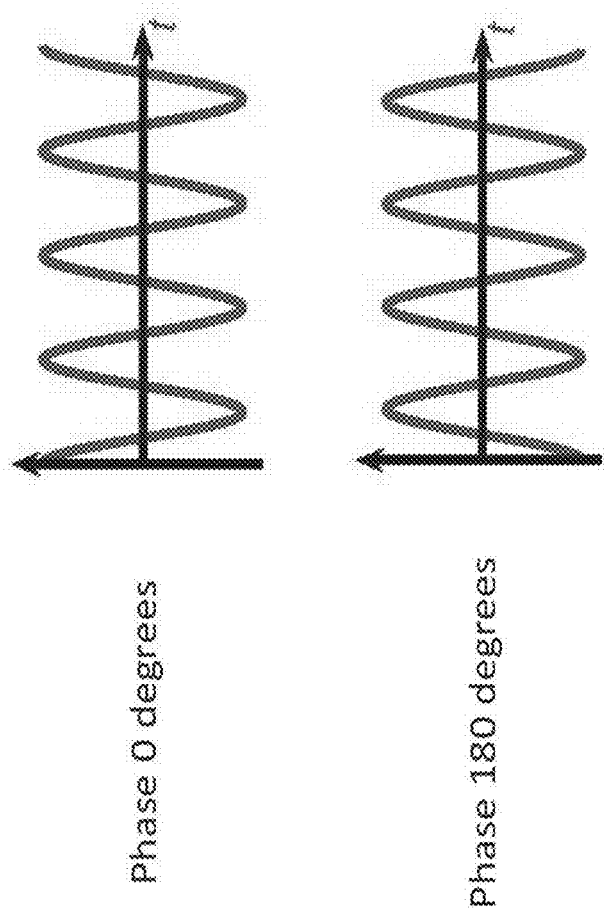
FIGS. 3 and 4 illustrate aspects of how PMCW digital radar works.

FIG. 3 illustrates the basic waveforms of a PMCW radar. Depending on the baseband signal, one of two phases of a sinusoidal signal are generated. In a binary system, one of two phases of a sinusoidal signal are generated, typically 0 degrees and 180 degrees. This also corresponds to transmitting a signal or the opposite of that signal when the binary baseband chip is a 0 or a 1. More than two phases could be used if the baseband signal is not binary.

Figure 4:
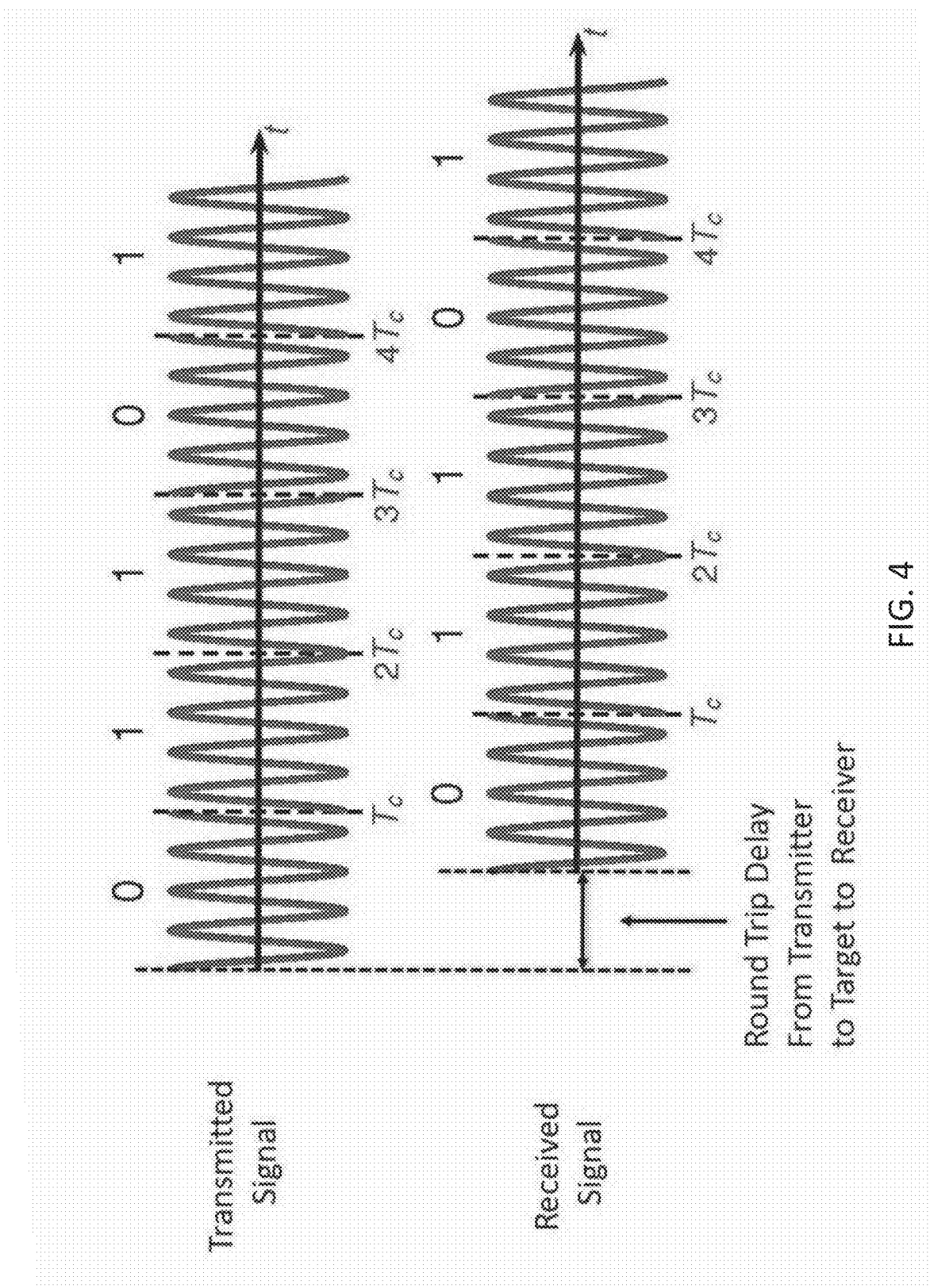

The transmitted radio signal is then a sequence of sinusoidal signals with different phases as illustrated in FIG. 4. Each phase lasts $T_c$ seconds, which is called the chip time. The inverse of the chip time is the chip rate, which is measured in chips per second. The chip rate might be on the order of 500 Mbps.

Also illustrated in FIG. 4 is the received radio signal that is due to a reflection of the transmitted radio signal from an object. The received radio signal (that includes the transmitted radio signal reflected from an object in the environment) will have the same basic shape as the transmitted radio signal but will be delayed by an amount corresponding to the round-trip time for the radio signal to propagate from the transmitter, to reflect from the object, and then back to be received by the receiver.

Figure 5:
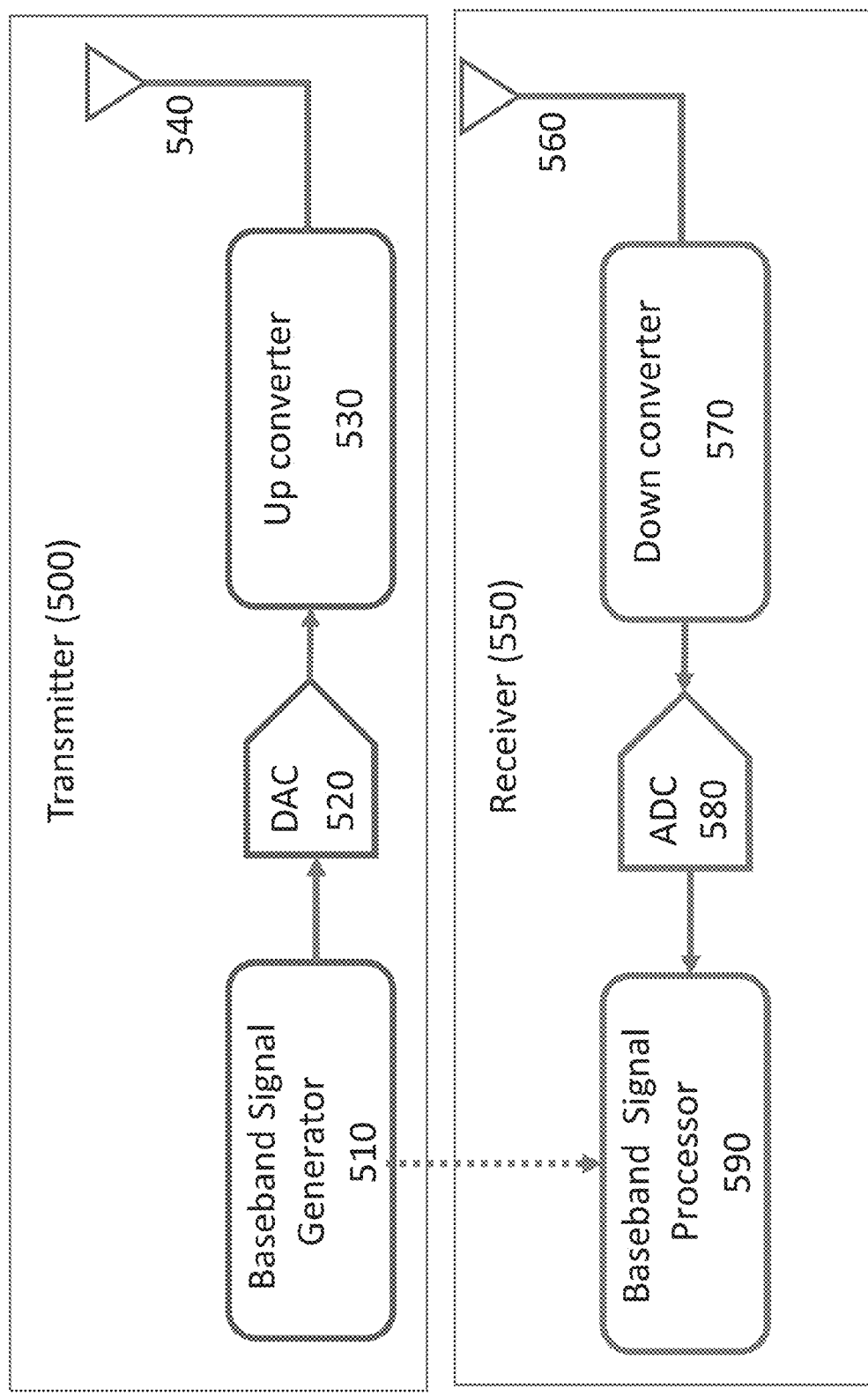
FIG. 5 is a block diagram illustrating the basic processing blocks of a transmitter and receiver in a radar system in accordance with the present invention.

FIG. 5 illustrates an exemplary block diagram of a transmitter 500 in a radar system and an exemplary block diagram of a receiver 550 in the radar system. There may be more than one transmitter 500 and more than one receiver 550 in the radar system. A baseband signal is generated by a base band signal generator 510 which outputs digital signal samples that are used to form a baseband signal. These samples could be complex samples, representing the in-phase (I) and quadrature-phase (Q) baseband signals. These samples are used as the input to a digital-to-analog converter (DAC), represented as block 520. The baseband analog signal at the output of the DAC is used as the input to the up-converter 530 which generates the RF signal for transmission through the transmit antenna 540. The received radio signal from the receiver antenna 560 is down-converted in an exemplary down-converter module 570, and sampled and quantized in an exemplary analog-to-digital converter (ADC) 580. The down-converted signals might be complex (or a pair of real signals) representing the in-phase (I) and quadrature-phase (Q) of the RF signal. The output of the ADC 580 is processed by the baseband processing unit 590. The baseband processing unit 590 will be aware of the baseband transmitted signal output from the baseband signal generator 510. Optionally, the baseband signal generator 510 and the baseband signal processor 590 may be combined into a single processor 510/590. There may be multiple baseband processing units 590 for a given ADC output that correspond to different transmitters (e.g., in a MIMO radar system, with multiple transmitters and multiple receivers). That is, for one receiver there may be a baseband processing unit that uses the baseband signal of a first transmitter and another baseband processing unit that uses the baseband signal of a second transmitter.

Figure 6:
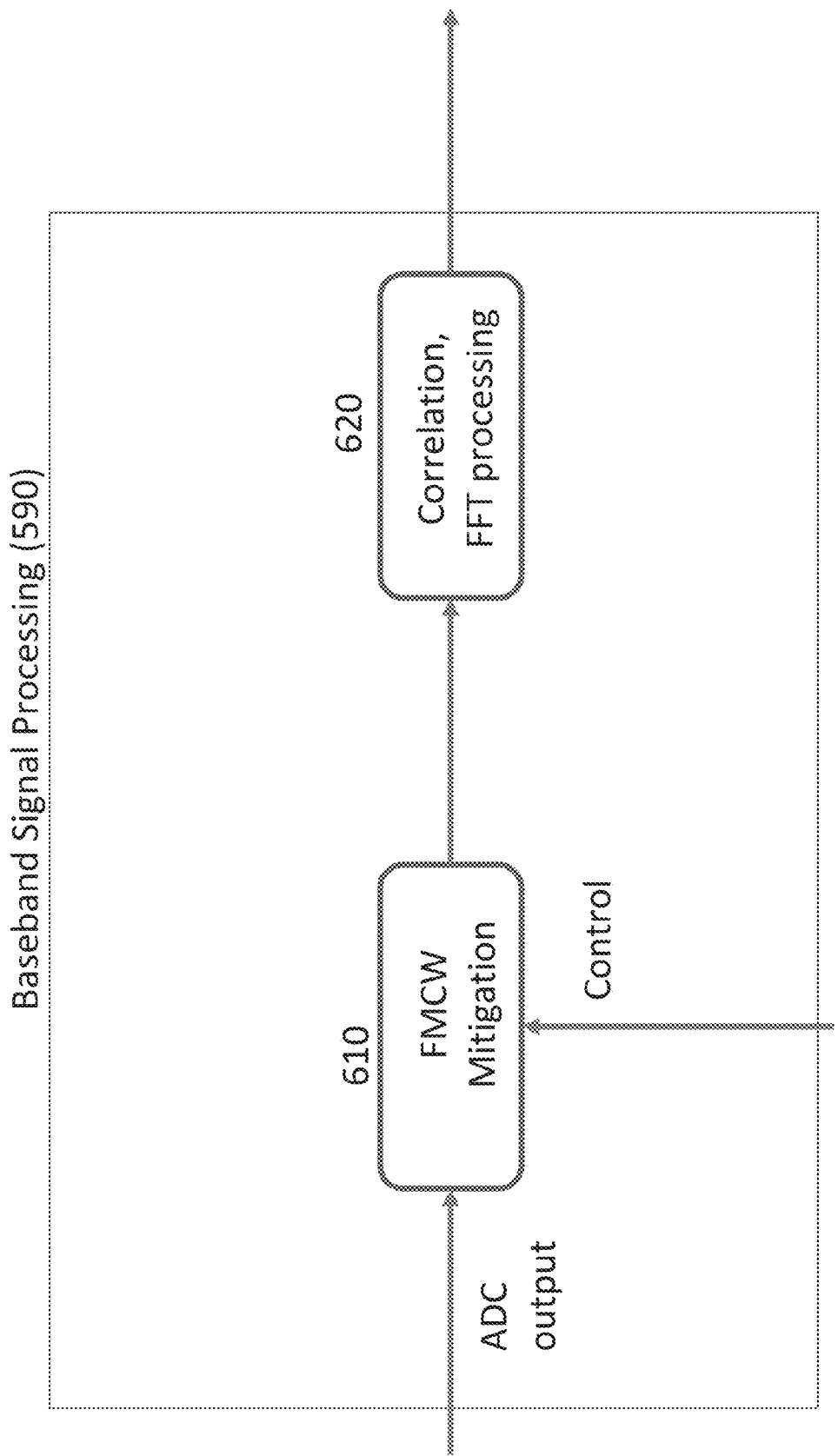
FIG. 6 is a block diagram illustrating an exemplary baseband signal processor in accordance with the present invention.

Aspects of the present invention are concerned with the baseband signal processing unit 590 of the receiver 550. Because there may be signal interference from one or more radar systems of the FMCW-type, the output of the ADC 580 at the receiver 550 may include an interfering frequency-modulated radio signal in addition to the desired radio signal that has been generated by the PMCW radar system transmitter, reflected off of objects in the environment, and then received for processing by the receiver 550. Mitigating interference from FMCW-type radar systems is the subject of this invention. In one aspect of the present invention, an adaptive filter is used to remove the interfering FMCW interference. However, it is possible that there are no waveforms from FMCW-type radar systems present (or that those waveform(s) are present, but below a threshold level), in which case there is no need to adaptively filter the received radio signal. As illustrated in FIG. 6, exemplary baseband signal processor 590 includes an FMCW mitigation module 610, followed by a correlation and FFT processing module 620 that provides further processing, such as a correlation to determine the range bin (distance) of an object, and an FFT to determine the velocity (or Doppler shift) of the object. An input to the FMCW mitigation module 610 is the output of the ADC 580. The results of the baseband processing for one receiver are combined with other similar receivers to perform an angle-of-arrival estimation of an object. The baseband processing unit 590 of one receiver 550 may be combined with the baseband processing of other receivers 550.

Baseband signal processor (590) will first adaptively filter the complex digitized sample with a least mean square (LMS) type of adaptive filter. An LMS filter is a well-known example of an adaptive filter that finds a difference between an input and an output, and using an error function and previous filter coefficients, determines updated filter coefficients. Exemplary LMS adaptation equations are illustrated below. The notation uses bold values for vectors. The vector $w_n$=represents the vector of L tap weights. The vector $x_n$ represents the last L inputs $x_n=(x_n, x_{n-1}, \ldots, x_{n-L+1})$. The step size parameter is denoted as $\mu$. A leakage coefficient a is chosen between 0 and 1.

$$w_{n+1} = Aw_n + \mu e_n x_n$$

$$e_n = x_n - y_n$$

$$y_n = w_n^T x_n$$

Figure 8:
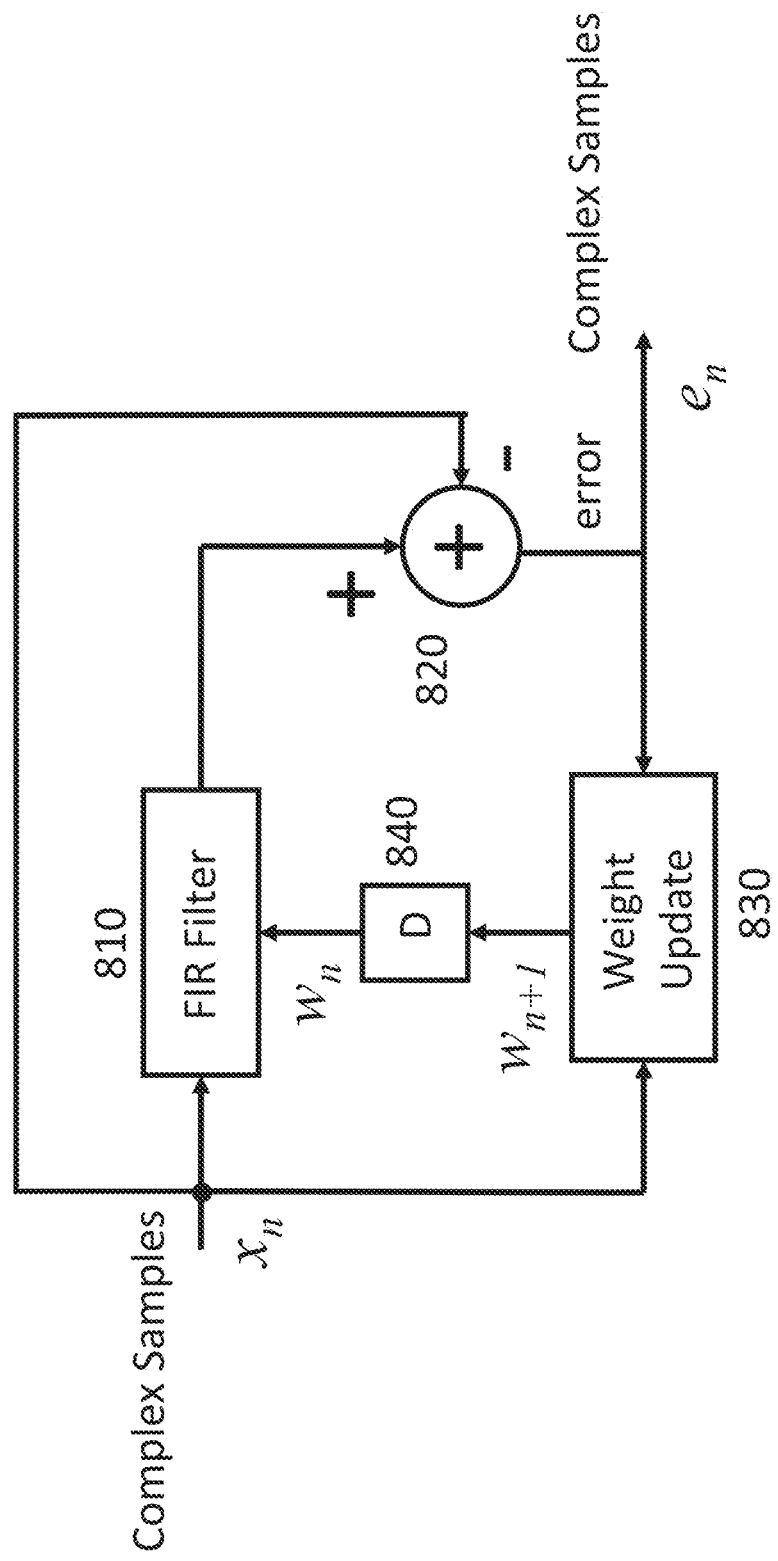
FIG. 8 is a block diagram illustrating the adaptive filter of FIG. 7 in accordance with the present invention.

FIG. 8 illustrates an exemplary block diagram of an adaptive filter 710. The adaptive filter of FIG. 8 includes a finite impulse response (FIR) filter 810 with L taps, an error calculator 820, and a weight update calculator 830. The FIR filter output is a correlation of the contents of a shift register with a weight vector w. The difference between the filter output and the input is an error signal. This is also the output of the mitigation filter. The error signal, the current input of complex samples, and the current set of weights used for the FIR filter, are used to update the set of weights of the FIR filter. In other words, the error signal is the output of the adaptive filter process. The eventual goal of the adaptive filter process will be to have removed much of the FMCW interference from the input of the filter.

The complex signal at the output of the interference mitigation filter will have reduced effect due to the interfering FMCW signal. As illustrated in FIG. 6, this mitigation filter output is correlated with the spreading code corresponding to one or more desired transmitters. After adaptively filtering the received radio signal, correlations with various delayed versions of the transmitted baseband signal are performed in the correlation, FFT processing module 620.

Figure 9:
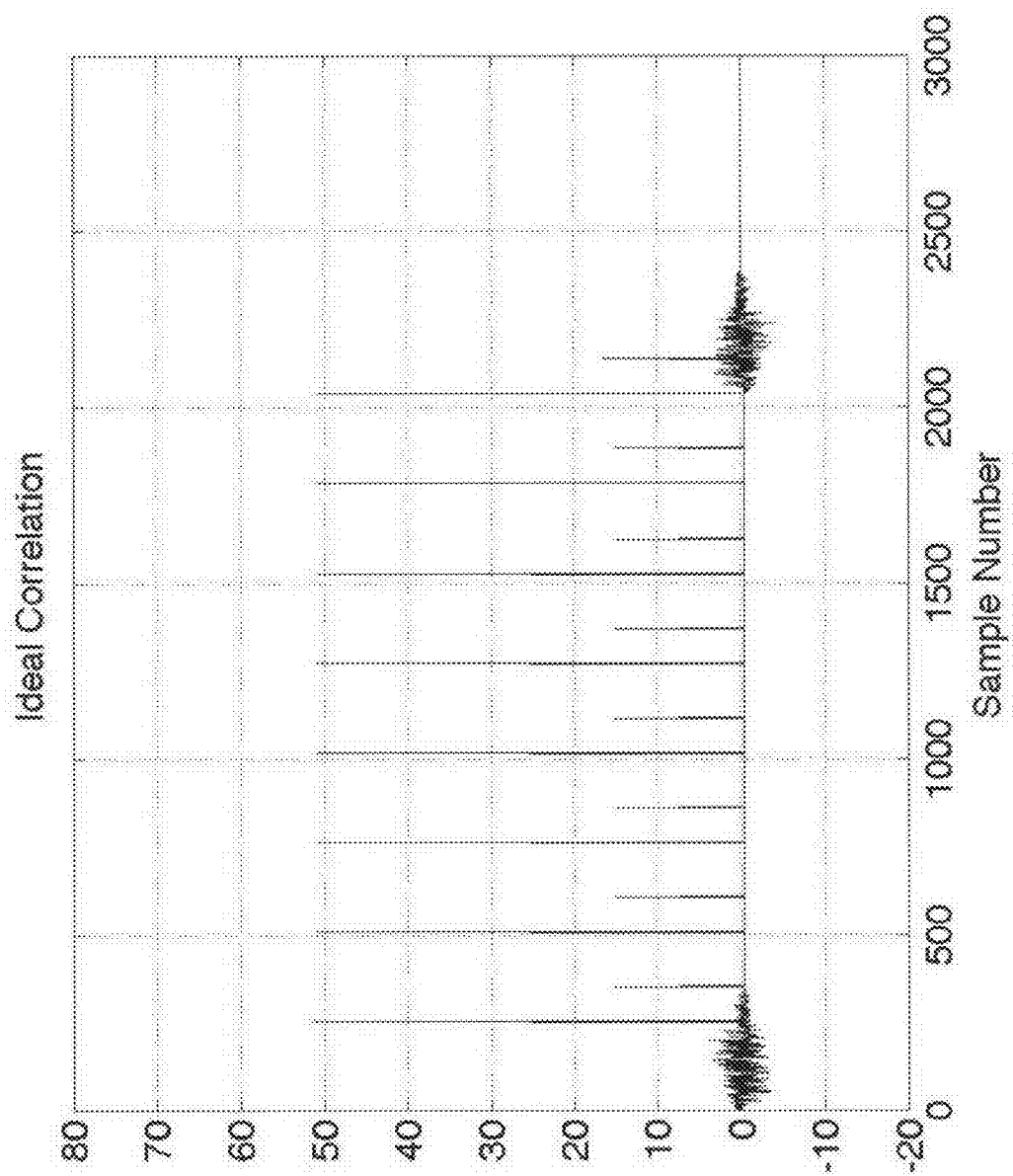
FIG. 9 is an exemplary plot of an output of a correlator without any external interference in the case of two objects in the environment in accordance with the present invention.

FIG. 9 illustrates an output of a matched filter when there are two objects in the environment but no other radar system operating. The exemplary transmitted radio signal is transmitting 8 periods of an m-sequence of length 255 with a chip rate of 500M chips/second. The received radio signal is down-converted, sampled, and used as the input to a matched filter where the filter is matched to one period of the m-sequence of length 255. A matched filter is a method of correlating the received signal with all possible delays of the transmitted sequence. The output has 8 large spikes corresponding to a near object for each period of the m-sequence transmitted. FIG. 9 also illustrates that there are also 8 smaller amplitude spikes corresponding to a more distant target/object.

Figure 10:
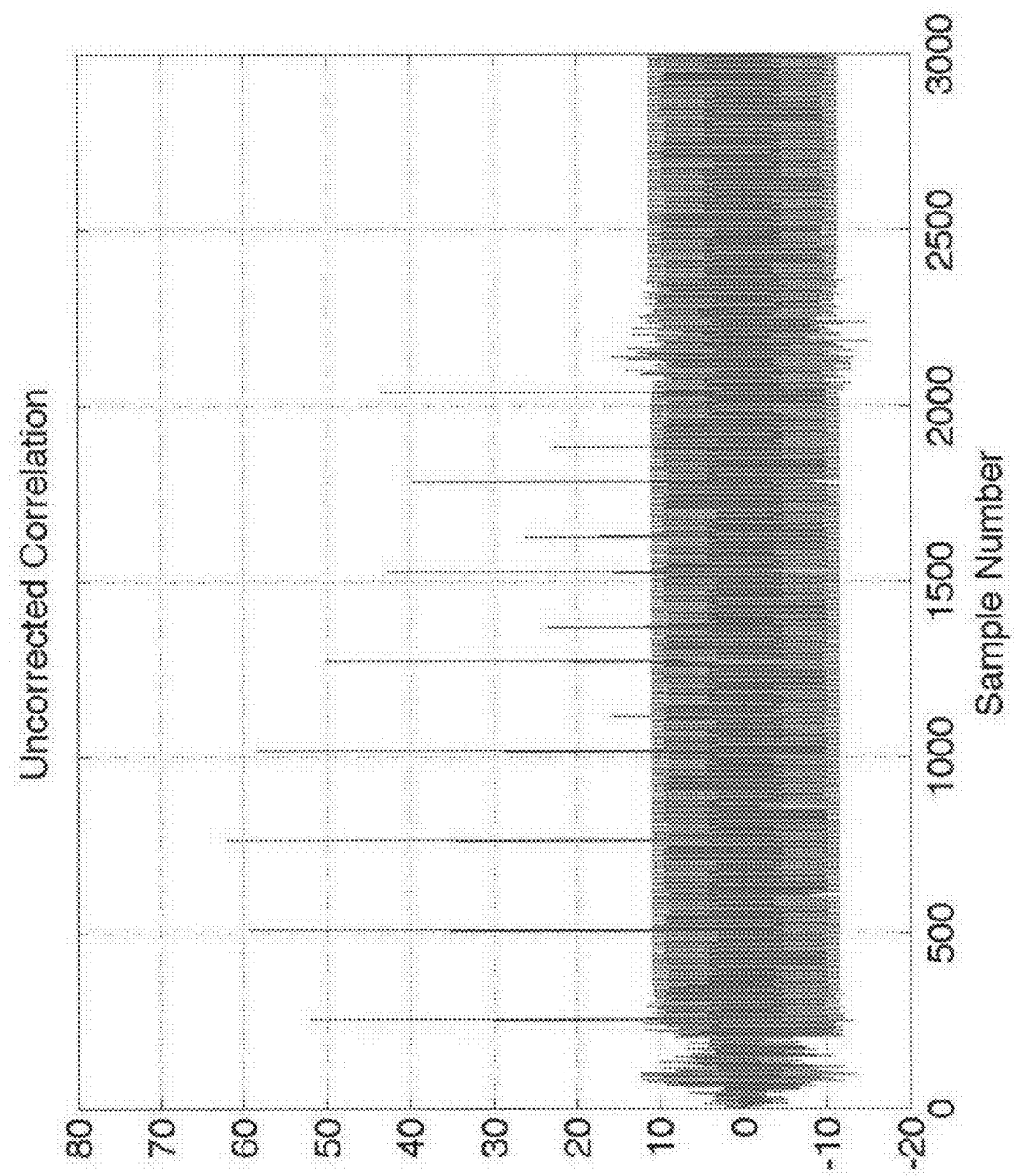
FIG. 10 is an exemplary plot of an output of a correlator with a fixed frequency external interferer without the adaptive mitigation processing in accordance with the present invention.

FIG. 10 illustrates an output of the same matched filter when, in addition to the two objects in the environment, there is a tone jammer with fixed frequency (which is similar to an FMCW radar system) that interferences with the reflected radio signals reflecting off of the objects. The output of the tone jammer, illustrated in FIG. 10 is used to simulate an interfering FMCW radar system. While the large spikes due to the radio signal reflecting off of the near object are still visible and detectable, the spikes due to the more distant object are sometimes lower than the signal due to the interference. Here, the interference is assumed to be 4 times (12 dB) larger than the desired signal from the nearer object.

Figure 11:
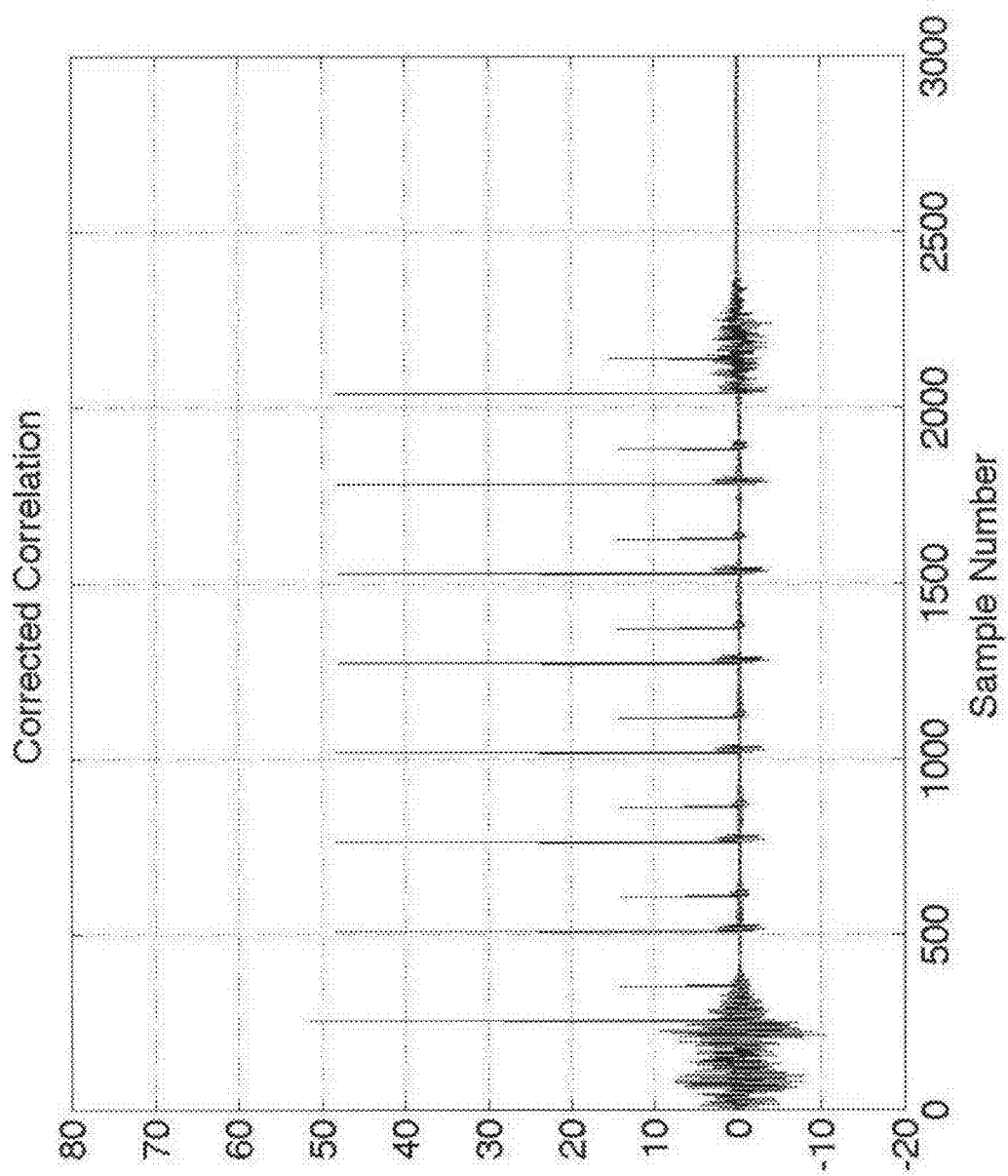
FIG. 11 is an exemplary plot of an output of a correlator with a fixed frequency external interferer with adaptive mitigation processing in accordance with the present invention.

FIG. 11 illustrates an output of the same matched filter when prior to performing the matched filtering, adaptive interference cancelling is done as described above. As illustrated in FIG. 11, the adaptive filter effectively removes the undesired signal(s) and now signals reflected from both the nearby object and from the more distant object are clearly visible.

Figure 12:
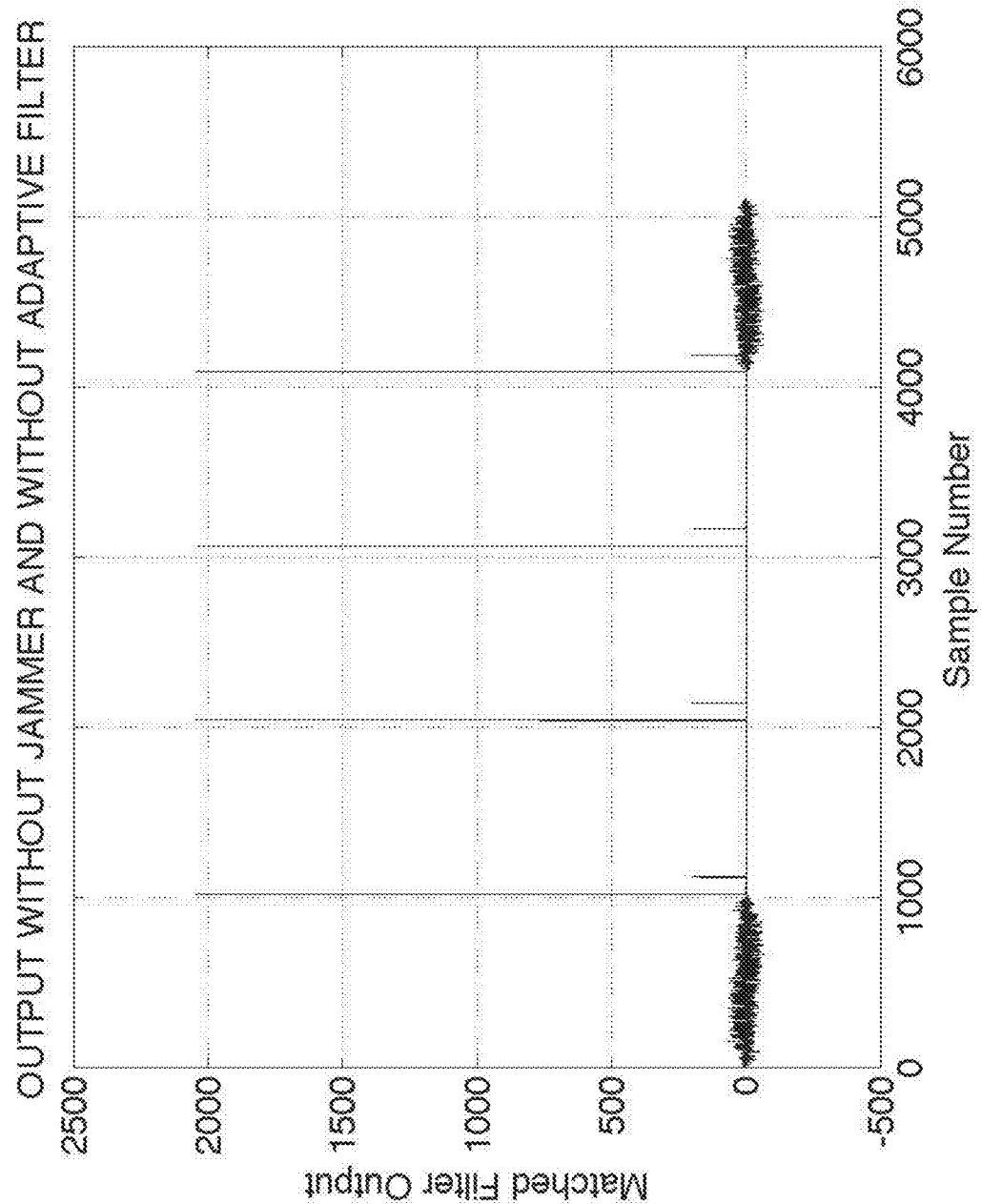
FIG. 12 is an exemplary plot of an output of a correlator without any external interference in the case of two objects in the environment and spreading codes of length 1023 in accordance with the present invention.
Figure 13:
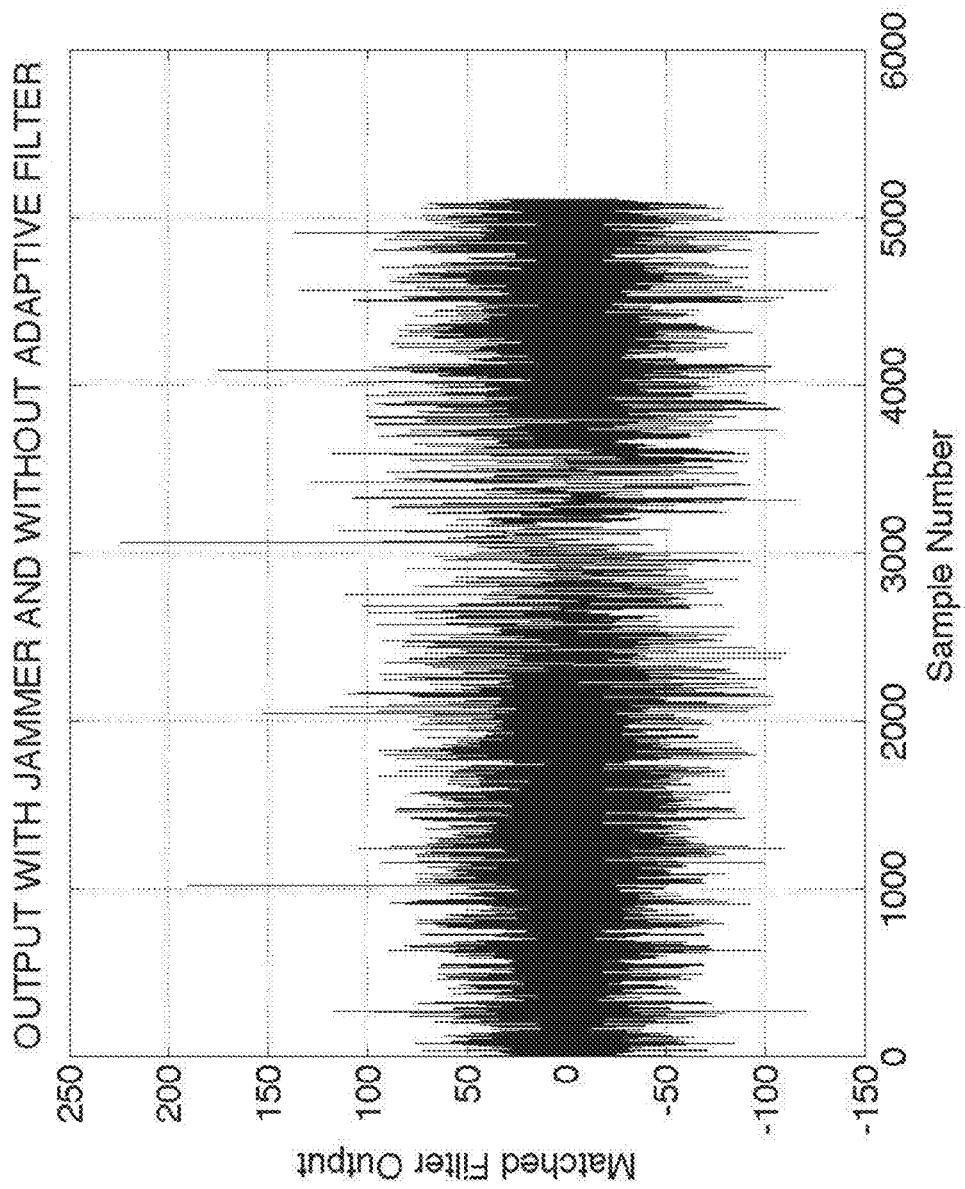
FIG. 13 is an exemplary plot of an output of a correlator with a chirp type external interferer without the adaptive mitigation processing in accordance with the present invention.
Figure 14:
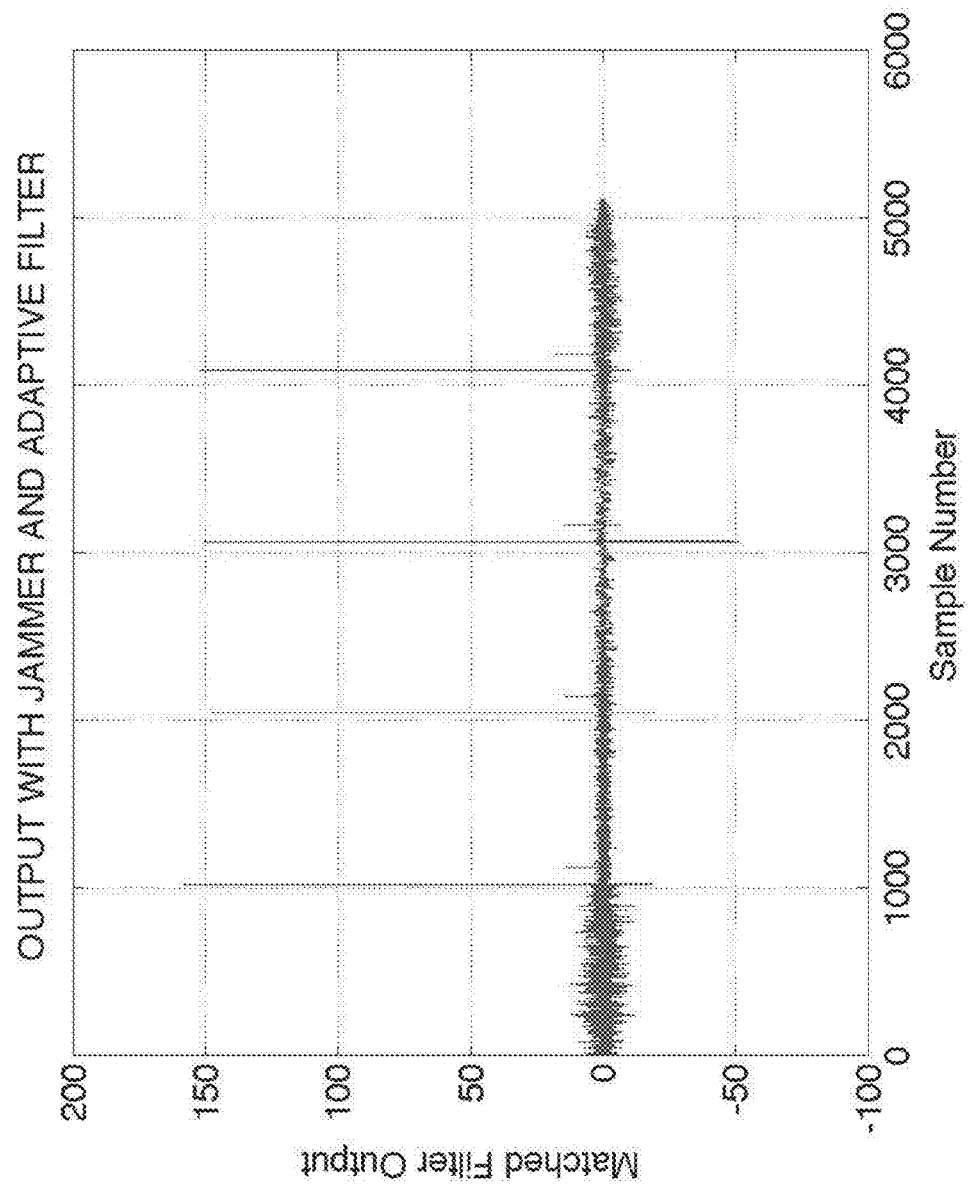
FIG. 14 is an exemplary plot of an output of a correlator with a chirp type external interferer with adaptive mitigation processing in accordance with the present invention.

As another example, consider a radar system that transmits 4 periods of a spreading code of length 1023 with a chip rate of 500 Mchips/s. There are two objects in the environment. FIG. 12 illustrates an exemplary filter output when there is no signal interference (e.g., from an FMCW radar or equivalent) in the signal input and no adaptive filtering performed by the adaptive filter 710. FIG. 13 illustrates an exemplary filter output when there is interference from another radar system, such as an FMCW radar that acts as a jammer. This FMCW radar transmits a chirp signal, which is a tone which varies in frequency. FIG. 13 further illustrates the effect of interference from an FMCW radar in the absence of any adaptive filtering. FIG. 13 also illustrates the output of a matched filter when the tone or chirp signal from the interfering FMCW radar has 20 dB larger amplitude than the desired return signals from the objects. As illustrated in FIG. 13, the second object (the more distant object) becomes buried in the interfering FMCW radar signal. When an adaptive filter is employed, as described herein, the interference from the FMCW radar may be significantly reduced so that the radio signal reflected from the second, weaker object is visible. This is illustrated in FIG. 14, where even when an input signal includes interference from an FMCW-type radar system, adaptive filtering has removed the majority of the interference so that the radio signal reflected from the second, weaker object is not buried in the interference.

Figure 7:
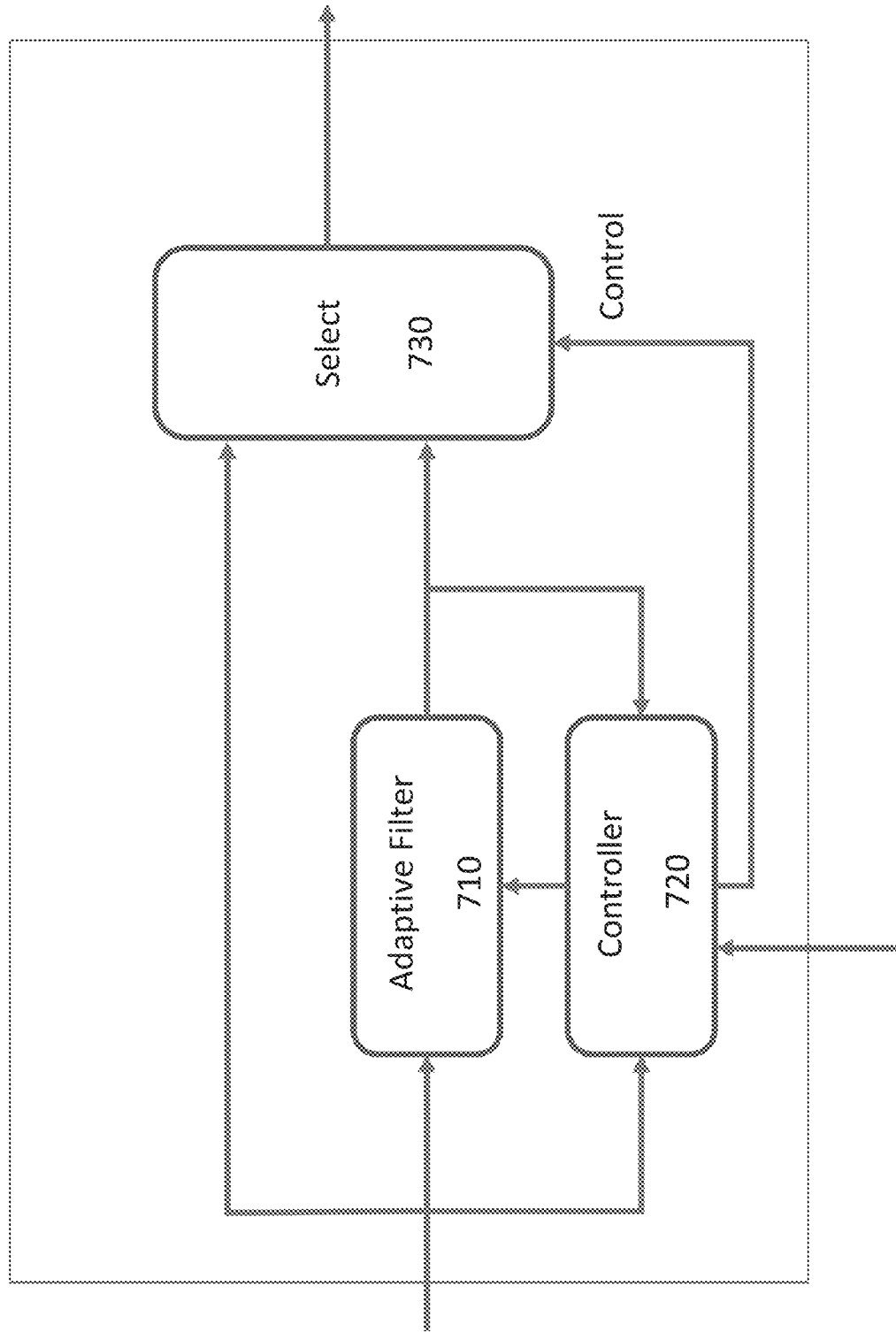
FIG. 7 is a block diagram illustrating an interference mitigation processor in accordance with the present invention.

In some cases, there is not another radar transmitting an FMCW-type of signal or the signal from an interfering FMCW-type radar is small in amplitude. In such a case, it is not useful to try to remove the nonexistent interference. As illustrated in FIG. 7, a selection mechanism 730 and controller 720 may be used to bypass the adaptive filtering (as performed by the adaptive filter 710). The selection mechanism 730 and controller 720 may also be referred to as a bypass mechanism. By default, the received radio signal bypasses the adaptive filter 710 without any cancelation/filtering. As illustrated in FIG. 7, the input radio signal to the adaptive filter 710 is also received by the selection mechanism 730 and a controller 720. To determine when to use the adaptive filter output and when to use the unfiltered input signal, a measurement of the root mean square (RMS) signal amplitude before and after cancelation/filtering may be performed by the controller 720 and a ratio of the RMS amplitude of the filter output to the RMS amplitude of the filter input is calculated. If the ratio is smaller than a selected threshold value, the adaptive filter's output, with the signal interference removed, is used. If the ratio is larger than the selected threshold value, the output of the adaptive filter is not selected for use, instead, the unfiltered input signal is used.

By default, the switch 730 that determines whether to employ the adaptive filtering can be set by the controller 720 to pass the received complex samples without any filtering. While a filter output is generated by the adaptive filter 710, the unfiltered signal is selected by the switch 730, as controlled by the controller 720.

An alternative to this automatic determination of whether to employ or bypass the interference canceller, software can be used to decide whether to use the adaptive filter, where the decision is based not only on the RMS values or amplitude of the input and output but upon other information as well. The other information could include information provided by other receivers in the radar system.

The preferred embodiments work with a value of mu between $2^{-6}$ and $2^{-13}$. The preferred leakage includes values from $2^{-8}$ to $2^{-15}$. The number of taps may be changed depending on the situation. The values of the taps may be read and written from a processor executing software. Optionally, the taps may be frozen (unchanged) for some period of time.

In a preferred embodiment, only a single adaption filter is needed, even for multiple receivers. For example, there may be separate complex FIRs for each receiver that use a same set of coefficients. This is possible because the correction or filtering is phase-independent. The notch filtering of the FMCW tone works for all RX paths even though they may be phase-shifted relative to each other. This may save quite a bit of area in the implementation.

Changes and modifications in the specifically described embodiments can be carried out without departing from the principles of the present invention, which is intended to be limited only by the scope of the appended claims, as interpreted according to the principles of patent law including the doctrine of equivalents.

The invention claimed is:

1. A radar sensing system for a vehicle, the radar sensing system comprising:
    a transmitter configured for installation and use on a vehicle, and further configured to transmit a radio frequency (RF) signal;
    a receiver configured for installation and use on the vehicle, and further configured to receive an RF signal that includes the transmitted RF signal reflected from objects in the environment, as well as further including other radio signals transmitted from at least one other radar system;
    a processor;
    an adaptive filter;
    a bypass mechanism;
    wherein the receiver is further configured to down-convert and sample the received RF signal to produce a sampled stream, and wherein the sampled stream is provided to the processor;
    wherein the processor, responsive to processing of the sampled stream, controls the adaptive filter to filter the sampled stream, such that the other radio signals transmitted from the at least one other radar system are removed from the received RF signal; and
    wherein the bypass mechanism is configured to determine whether an output of the adaptive filter is to be selected or an unfiltered sampled stream is to be selected.

2. The radar sensing system of claim 1, wherein the adaptive filter comprises a least mean square (LMS)-type of filter.

3. The radar sensing system of claim 2, wherein the LMS-type filter includes a finite impulse response filter.

4. The radar sensing system of claim 3 comprising a plurality of receivers, each with a finite impulse response (FIR) filter, wherein all of the FIR filters use the same weight values for processing the received signal.

5. The radar sensing system of claim 3, wherein a portion of the coefficients are adapted and another portion of the coefficients are held constant.

6. The radar sensing system of claim 1, wherein the bypass mechanism is configured to make a selection based at least in part on a root mean square (RMS) amplitude value of an input of the adaptive filter and an RMS amplitude value of the output of the adaptive filter.

7. The radar sensing system of claim 1, wherein the unwanted interference is internal to the system.

8. The radar sensing system of claim 1, wherein the unwanted interference is due to clock spurs.

9. The radar sensing system of claim 1, wherein the at least one other radar system comprises at least one frequency modulated continuous wave radar system.

10. A radar sensing system for a vehicle, the radar sensing system comprising:
    a transmitter configured for installation and use on a vehicle, and further configured to transmit radio signals;
    a receiver configured for installation and use on the vehicle, and further configured to receive radio signals that include the transmitted radio signals reflected from objects in the environment, as well as further including other radio signals transmitted from at least one other radar system;
    a processor;
    an adaptive filter;
    wherein the receiver is further configured to down-convert and sample the received radio signals to produce a sampled stream, and wherein the sampled stream is provided to the processor;
    wherein the processor is configured to control the adaptive filter, and responsive to the processor, the adaptive filter is configured to output a filtered sampled stream, such that the effect of radio signals transmitted from the at least one other radar system are removed from the sampled stream; and
    wherein the processor is further configured to measure an amplitude of the sampled stream and to measure an amplitude of the filtered sampled stream, and wherein the processor is further configured to select the filtered sampled stream for further range and velocity processing when a ratio of the amplitude of the filtered sampled stream to the amplitude of the sample stream is below a first threshold, otherwise the sampled stream is selected for the further range and velocity processing.

11. The radar sensing system of claim 10, wherein the processor is further configured to measure the amplitudes of the filtered sampled stream and the sampled stream by measuring root mean square signal levels of the filtered sampled stream and the sampled stream.

12. The radar sensing system of claim 10, wherein the stream selected for further processing is forwarded to a correlator and fast Fourier transform (FFT) processing module for further processing.

13. The radar sensing system of claim 10, wherein the adaptive filter comprises a least mean square (LMS)-type of filter.

14. The radar sensing system of claim 13, wherein the LMS-type filter includes a finite impulse response filter.

15. The radar sensing system of claim 10, wherein the at least one other radar system comprises at least one frequency modulated continuous wave radar system.

16. A method for removing interference from a radio signal received by a vehicle radar sensing system, said method comprising:
providing a radar sensing system comprising a transmitter configured for installation and use on a vehicle and configured to transmit radio signals, and a receiver configured for installation and use on the vehicle and configured to receive radio signals that are the transmitted radio signals reflected from objects in the environment, and wherein the received radio signals further include other radio signals transmitted from at least one other radar system;
providing an adaptive filter;
down-converting and digitizing the received radio signals to produce a baseband sampled stream;
providing the baseband sampled stream to the adaptive filter, wherein the adaptive filter is configured to output a filtered baseband sampled stream, such that the effect of the radio signals transmitted from the at least one other radar system are removed from the baseband sampled stream;
measuring an amplitude of the baseband sampled stream and measuring an amplitude of the filtered baseband sampled stream; and
selecting the filtered baseband sampled stream for further range and velocity processing when a ratio of the amplitude of the filtered baseband sampled stream to the amplitude of the baseband sampled stream is below a first threshold, otherwise, selecting the baseband sampled steam for the further range and velocity processing.

17. The method of claim 16, wherein measuring the amplitudes of the filtered baseband sampled stream and the baseband sampled stream comprise measuring root mean square signal levels of the filtered baseband sampled stream and the baseband sampled stream.

18. The method of claim 16, wherein the further range and velocity processing comprises correlation and fast Fourier transform (FFT) processing, respectively.

19. The method of claim 16, wherein providing an adaptive filter comprises providing a least mean square (LMS)-type of filter.

20. The method of claim 19, wherein the LMS-type filter includes a finite impulse response filter.

21. The method of claim 16, wherein the at least one other radar system comprises at least one frequency modulated continuous wave radar system.

* * * * *